United States Patent

[11] 3,586,432

| [72] | Inventor | Jack M. Pentes, Jr.<br>Charlotte, N.C. |
|---|---|---|
| [21] | Appl. No. | 812,232 |
| [22] | Filed | Apr. 1, 1969 |
| [45] | Patented | June 22, 1971 |
| [73] | Assignee | Pentes Design Incorporated<br>Charlotte, N.C. |

[54] SELF-CONTAINED IMAGE PROJECTING APPARATUS AND REAR PROJECTION SCREEN THEREFOR
1 Claim, 3 Drawing Figs.

[52] U.S. Cl. ........................................ 353/74, 353/94
[51] Int. Cl. ........................................ G03b 21/22
[50] Field of Search ........................... 353/94, 13, 14, 74; 350/125; 52/2

[56] References Cited
UNITED STATES PATENTS

| 3,346,978 | 10/1967 | Letsinger | 52/2 |
| 2,592,444 | 4/1952 | Matelena | 353/74 |

*Primary Examiner*—Harry N. Haroian
*Attorney*—Parrott, Bell, Seltzer, Park & Gibson ABSTRACT: Image projecting apparatus comprising a translucent rear projection screen for receiving projected images on the rear side thereof and for presenting the images for observation on the front side thereof. The screen is three-dimensional, preferably generally spherical in shape for providing a smoothly curved outside observation surface of at least 270°, and defines at least a substantially enclosed hollow interior for containing entirely therewithin a complete image projector means so that images from the projector means may be projected through the screen to any desired portion of the outside circumference of the screen. The screen is preferably flexible and inflatable for being internally air supported in its three-dimensional configuration to provide ease in assembly and disassembly around the projector means. The image projecting apparatus may also preferably include a plurality of projectors rotatably mounted in different positions within the screen for projecting a plurality of moving images onto a plurality of portions of the screen and an air supply means connected with the hollow interior of the screen for providing air internally thereof to inflate and support the inflatable and flexible screen around the projector means.

INVENTOR:
JACK M. PENTES, JR.

BY Parrott, Bell, Seltzer, Park & Gibson
ATTORNEYS

SELF-CONTAINED IMAGE PROJECTING APPARATUS AND REAR PROJECTION SCREEN THEREFOR

This invention relates to image projecting apparatus comprising a translucent rear projection screen defining at least a substantially enclosed hollow interior containing entirely therewithin a complete image projector means so that images from the projector means may be projected through the screen to any desired portion of the outside circumference thereof.

Heretofore, it has been proposed to project images onto concave or spheroidal screens both by front and rear projection methods. However, none of these prior devices provided image projecting apparatus in which substantially all of the component parts were self-contained within a rear projection screen so that substantially all of the outside circumference of the apparatus could be utilized for observing images. Also, none of the prior image projecting devices utilized a flexible and inflatable rear projection screen which could be easily assembled and disassembled around a projector means. Moreover, the prior image projecting devices have not utilized rotating complete projector means self-contained entirely within a rear projection screen for presenting either a single or a plurality of images moving around the circumference of the screen.

Accordingly, it is the object of this invention to provide image projecting apparatus which may be utilized for display, educational, entertainment or other purposes and which is substantially completely self-contained and which will utilize substantially all of the outside circumference thereof for observation of a variety of images which may be projected thereby.

It is a further more specific object of this invention to provide an improved image projecting apparatus, of the character described above, in which a rear projection screen may be easily and quickly assembled and disassembled around one or a plurality of projector means self-contained therewithin.

It has been found by this invention that the above objects may be accomplished by providing image projecting apparatus comprising a translucent rear projection screen for receiving projected images on the rear side thereof and for presenting the images for observation on the front side thereof. The screen is three-dimensional and defines at least a substantially enclosed hollow interior for containing entirely therewithin a complete image projector means so that images from the projector means may be projected through the screen to any desired portion of the outside circumference of the screen. The screen is preferably generally spherical in shape for providing a smoothly curved outside observation surface of at least 270° and is preferably flexible and inflatable for being internally air supported in its three-dimensional configuration to provide ease in assembly and disassembly around a projector means.

The image projecting apparatus may also preferably include a single or a plurality of image projectors mounted on a mounting and rotating means in different positions within said screen in said hollow interior for rotating about a centrally disposed axis for projecting a plurality of moving images onto a plurality of portions of the screen. The image projecting apparatus may also further include air supply means connected with the hollow interior of the screen for providing air internally of the screen to inflate and support the flexible and inflatable screen around the projector means.

Some of the objects and advantages of the invention having been stated, other objects and advantages will appear as the description proceeds when taken in conjunction with the accompanying drawings, in which.

Figures 1, 2, 3:
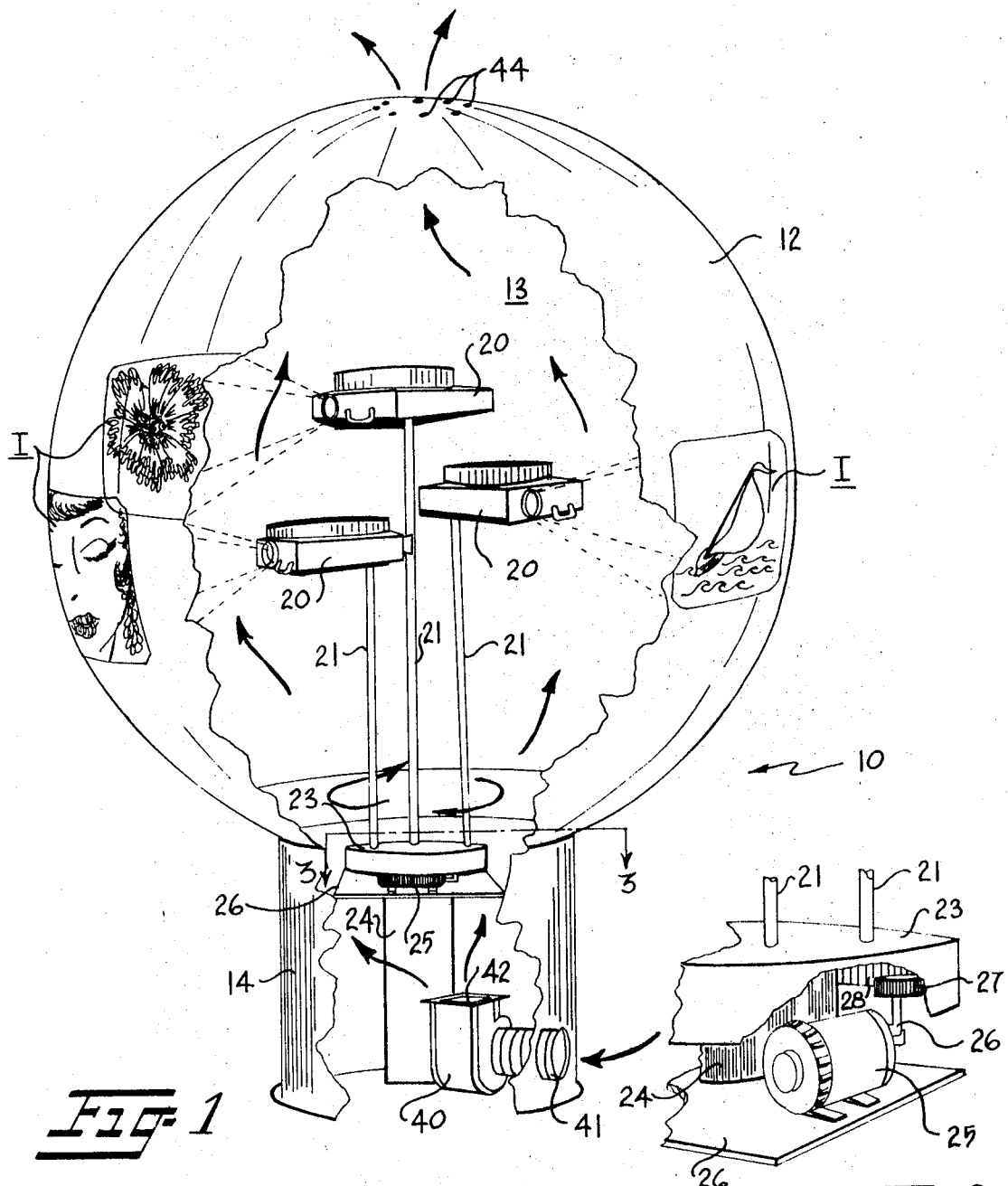
FIG. 1 is an elevational view, parts of which have been broken away, illustrating one preferred form of the image projecting apparatus of this invention utilizing the improved rear projection screen.
FIG. 2 is a perspective detail, partially broken away, of a portion of the turntable or rotating means for the image projectors including the drive therefor.
FIG. 3 is a cross-sectional view taken substantially along the line 3–3 of FIG. 1 with portions of the structure broken away and illustrating the relative arrangement of the component parts of the image projecting apparatus of FIG. 1.

Referring now to the drawings, the image projecting apparatus of this invention is illustrated in FIG. 1 and is referred to generally by the reference numeral 10. The image projecting apparatus comprises a translucent, three-dimensional, rear projection screen 12 for receiving projected images I on the inside surface thereof and for presenting the images for observation on the outside surface thereof.

The rear projection screen 12 could be of any desired three-dimensional shape, but is preferably generally spherical in shape, as shown in FIG. 1, for providing a smoothly curved outside observation surface so that the images may be projected through the screen to any desired portion of the outside circumference thereof. The screen 12 defines at least a substantially enclosed hollow interior 13.

As illustrated in FIG. 1, the generally spherical-shaped rear projection screen 12 is mounted on a hollow cylindrical base 14 and includes an opening in the bottom thereof communicating with the interior of the hollow cylindrical base 14. By this arrangement, at least 270° of the outside circumference of the projection screen 12 is available for receiving and presenting images I for observation on the outside surface thereof. It is to be understood that the base portion 14 could be eliminated and a completely spherical-shaped projection screen could be provided without an opening in the bottom thereof.

Although the projection screen 12 may be supported in its desired configuration in any suitable manner either stationary or collapsible, it is preferably constructed of a flexible air impermeable material which allows the screen to be inflated and air supported in its preferred generally spherical shape. A suitable material for use as the translucent rear projection screen is vinyl or any suitable plastic rear screen material or translucent material which is flexible and inflatable.

The image projecting apparatus 10 further includes complete projector means including a light source, film and lens and preferably in the form of a plurality of slide projectors 20 positioned entirely within the projector screen 12 in the hollow interior 13 for projecting a plurality of images I on any desired portions of the outside circumference of the projection screen 12, as shown in FIG. 1. These projectors 20 may be any conventional and commercially available automatic slide projectors which carry a cartridge of slides for automatic, multiple, serial image projection. These projectors could also be of the motion picture type or any desired type of image projector and this invention is not intended to be limited by the specific type or number of image projectors used.

As illustrated in FIG. 1, these images projectors 20 are preferably carried on one end of elongate support members 21 which are secured at their other end to a driven, rotating turntable 23. As may be seen in FIG. 1, the supports 21 may be of varying lengths so that the projectors 20 may be carried at different positions within the hollow interior 13 of the projection screen 12. It is to be understood that any arrangement of positions and number of projectors could be used according to the image projection effect desired on the outer circumference of the projection screen 12. The turntable 23 is rotatably mounted on a base 24 by any suitable means (not shown), such as roller bearings or the like.

Mounted directly below the turntable 23 is a plate 26 which carries any suitable motor 25 which includes a gear reduction and right angle drive shaft means 26 on one end thereof which drives a rotatable gear 27. The gear 27 meshes with internal gear teeth 28 on the inside of the turntable 23, as shown in FIG. 2, to drive the turntable 23 and thus the projectors 20 in a clockwise direction, as indicated by the arrows in FIG. 1. Thus, it may be seen that the turntable 23 will rotate the projectors 20 about an axis centrally disposed within the hollow interior 13 of the projection screen 12 so that the plurality of images I will be moved around the outside circumference of the screen 12. However, it is to be understood that stationary projectors would function for the purposes of this invention.

The image projecting apparatus 10 further comprises an air supply means 40 which may be in the form of any conventional fan or blower and which includes an air intake conduit 41 extending through the base 14 for pulling air therein and an air outlet 42 for expelling air into the hollow interior of the base 14, around the plate 26 and into the hollow interior 13 of the projection screen 12 for inflating the projection screen 23 around the projectors 20 and maintaining the inflatable projection screen 12 in its generally spherical shape. Air exit apertures 44 are provided in the upper portion of the projection screen 12 to allow the escape of air from the projection screen 12 to prevent bursting thereof and to maintain a pressure within the projection screen 12 sufficient for inflation thereof.

Thus, it may be seen that an image projecting apparatus has been provided which is characterized by having the component parts self-contained therewithin so that substantially the entire outside surface thereof may be utilized for observing the images projected thereby. Although the specific preferred embodiment is illustrated in the drawings and has been described in detail above, this invention is not intended to be limited by this description or otherwise and is not intended to be limited by this description or otherwise and is intended to include various combinations of the novel features set forth above, as defined in the appended claims.

What I claim is:

1. Image projecting apparatus characterized by having the component parts self-contained therewithin so that substantially the entire outside surface thereof may be utilized for observing the image projected thereby, said apparatus comprising:

hollow base means for mounting components of said apparatus, a translucent, spherically inflatable, flexible rear projection screen for receiving projected images on an inside surface thereof and for presenting the images for observation on a smoothly curved outside surface of at least 270°, said screen having an opening at the lower extremity thereof encircling and secured to the upper extremity of said hollow base means for communication with the interior thereof and having air exit apertures in a portion thereof remote from said hollow base means and defining an enclosed hollow interior for being supported in spherical configuration solely by the pressure of air flowing therethrough, turntable means within said base means mounted for rotation, a plurality of projectors supported from said turntable means and enclosed within said hollow interior of said screen for projecting a corresponding plurality of images on desired portions of the outside circumference of said screen, and air supply means mounted within said base means and operatively communicating with said hollow interior of said screen for directing a continuing flow of air therethrough to inflate and support said screen about said projector means and for cooling said projectors.